United States Patent Office 2,861,024
Patented Nov. 18, 1958

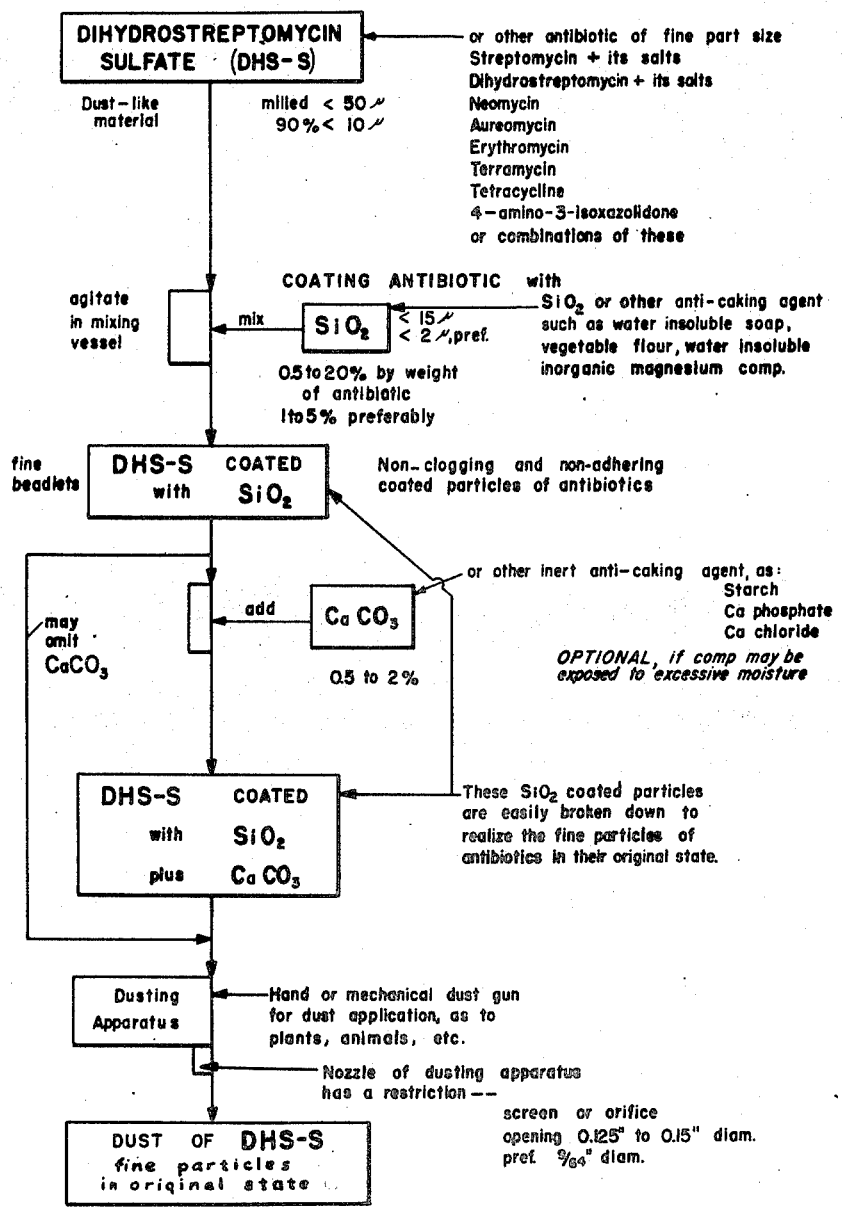

2,861,024

ANTIBIOTIC DUSTS

Leonard H. Silver, Cranford, N. J., assignor to Merck & Co., Inc., Rahway, N. J., a corporation of New Jersey Application November 12, 1957, Serial No. 695,763

14 Claims. (Cl. 167—65)

This invention relates to the treatment of animals having respiratory diseases and in particular to antibiotic compositions in the form of dusts useful in such treatment. The present application is a continuation-in-part of my pending applications Serial Nos. 518,991, 518,992, 518,993 and 518,994, all filed on June 29, 1955, and now abandoned.

Respiratory diseases in farm animals are particularly difficult to treat due to the complex nature of such infections and the large number of animals which require treatment. In relatively recent years, chronic respiratory disease (CRD) has become recognized as a serious infectious disease of poultry, particularly broiler chickens. The term CRD as commonly used embraces the extremely serious poultry disease termed "air-sac infection" and "air-sac cold." This disease is evidenced by a persistant, rasping cough and invariably affects the feed consumption of the chicken and results in poor feathering, slower growth and a decrease in laying flocks of 20 to 40% in egg production as well as death. Heavy economic losses are attributed to this disease, particularly in the broiler raising areas, as for example in the Delmarva (Delaware-Maryland-Virginia) area alone it has been estimated to have caused a twenty million dollar loss in a few months.

Several experimental respiratory diseases in animals, including air-sac infection in chickens, have responded satisfactorily to relatively high blood levels of antibiotics such as streptomycin. It has been necessary, to obtain such high blood levels, to administer the streptomycin parenterally. Such individual treatment may be considered practical for the large animals such as horses, cows and pigs, but it is most unsatisfactory for the treatment of smaller animals such as chickens, turkeys and the like. The oral ingestion of streptomycin by way of the drinking water of the animals has proven unsatisfactory for treatment of diseases other than those associated with the intestinal tract.

It has been suggested to use aerosols or mists of streptomycin solutions for treating respiratory disease in animals. This method while being very desirable as a simple means of administration is not entirely satisfactory in combating such diseases in the animals treated. This failure is apparently due to the fact that the droplets obtained when an aqueous solution of streptomycin is nebulized are too heavy and do not remain suspended in the atmosphere for sufficient time to permit inhalation by the birds. This characteristic requires the use of an aerosol with an extremely high concentration of antibiotics to obtain even a minimum blood level of antibiotics. The conventional aerosols also have the disadvantage that the aqueous solutions are corrosive in the presence of the propellant and that they dissolve only relatively small amounts of the propellant such as the Freons or nitrous oxide. A fourth disadvantage of such aerosols is that they require the addition of other agents to make them operable such as stabilizers and emulsifying agents.

More recently it has been suggested to use aerosols of fine solid particles of dihydrostreptomycin which have proven remarkably effective in controlling respiratory diseases in animals. However, a serious defect in this method of treatment, is that the only convenient size of aerosol container is relatively small, and the cost of such containers is high. The effectiveness of the fine particles of antibiotics in controlling respiratory diseases has suggested the application of such powders by the conventional sprays or dust guns which are used for controlling insects and blight diseases. This procedure, however, has not proved practical because the fine particles of antibiotic cake and coat the inside of such apparatus, thereby clogging the apparatus and substantially reducing the quantity of material which can be discharged.

An object of the invention is to provide an antibiotic composition which is effective in alleviating respiratory diseases in animals and which can be conveniently and economically applied in large quantities. A related object is to provide a simplified process for treating animals with solid particles of antibiotics. Other objects and the advantages of the invention will appear hereinafter.

In accordance with the invention, it has been found that a solid composition containing fine particles of antibiotics can be prepared which can be administered from conventional spray guns and dusting apparatus without caking or clogging the apparatus. Such compositions are prepared by coating the fine particles of antibiotics with fine particles of a coating agent, such coating agent being an anti-caking agent selected from the group consisting of silicon dioxide, water insoluble soaps (insoluble metal salts of stearates and palmitates), vegetable flours, and water insoluble inorganic salts of magnesium.

Any of the antibiotics effective against respiratory diseases in animals can be used in this invention, but streptomycin, dihydrostreptomycin and salts thereof are preferred. Typical examples of the other antibiotics which can be used are neomycin, aureomycin, erythromycin, terramycin, tetracycline and 4-amino-3-isoxazolidone. Also various combinations of antibiotics can be used as for example a combination of one-half streptomycin and one-half dihydrostreptomycin, or a combination of dihydrostreptomycin and neomycin. The antibiotics are preferably used in the form of a non-toxic active salt, as for example the salts of streptomycin and dihydrostreptomycin, such as the hydrochloride, sulfate and calcium chloride complex salts can be conveniently utilized. The usual salt form of the antibiotics are their mineral acid addition salts. The antibiotics can be used in relatively crude form, thereby having an additional advantage in that the expensive final purification measures used in parenteral antibiotic preparations are not necessary.

It is essential in the treating of the animals that the antibiotics be present in an extremely fine order of subdivision. The antibiotics are preferably milled to particles substantially all of which are below 50 microns and more desirably 20 microns in size. It is preferred to have the bulk of the material of about 90% below 10 microns.

The coating of the fine particles of antibiotics with the anti-caking agent is conveniently accomplished by mixing the components together. This mixing results in the coating of the particles with a film of anti-caking agent which to the eye appears to increase the size of the particles. The change in appearance of the particles of antibiotic is remarkable in that they change from a dust-like material to fine beadlets. This change in physical characteristics of the antibiotic is apparently due to a loose surface adsorption of the anti-caking agent on the antibiotic particles. Although all of the antibiotic present is probably not completely encased by anti-caking agent, the operation is referred to herein as a coating step. The anti-caking agent is preferably present in from 0.5 to 20% by weight of the antibiotic and more conveniently from 1 to 5% by weight. The particle size of the anti-caking agent is critical in that particles above 15 microns in size do not coat the particles of the antibiotic. The particle size of the anti-caking agent is preferably less than about 10 microns, and with particular types of anti-caking agents, the optimum particle size is as follows:

|  | Microns |
|---|---|
| Silicon dioxide | less than 2 |
| Water insoluble soaps | less than 1 |
| Vegetable flour | less than 10 |
| Salts of magnesium | less than 5 |

With respect to identification and description of suitable anti-caking agents for coating antibiotic particles in accordance wtih my invention, silicon dioxide requires no special comment. In the case of water insoluble soaps, the most typical examples of water insoluble soaps are the alkali and alkali earth metal stearates and palmitates. The metal component of the soap can, however, be a metal found in any of the groups IA, IB, IIB, IIIA, IVA, IVB, VIB, VIIB and VIII of the periodic table. Within this group calcium stearate is the most outstanding in its ability to prevent caking and coating of the dusting apparatus. Other insoluble soaps which can be mentioned are magnesium stearate, manganese stearate, magnesium palmitate, calcium palmitate, zinc stearate, magnesium stearate, iron stearate, lithium stearate, zinc palmitate and iron palmitate.

Typical examples of suitable vegetable flours for use as anti-caking agents are soya flour, beet flour, corn flour, potato flour, rye flour, barley flour, buckwheat flour, rice flour, and bean flour. Typical examples of water insoluble inorganic salts of magnesium for use as anti-caking agent are those having solubility in water of from 0.04 to 0.0006 part per 100 parts of water at 20° C. including for example, magnesium oxide, magnesium carbonate, magnesium pyrophosphate, magnesium aluminate and ammonium magnesium phosphate.

In addition to the anti-caking agent which acts as coating agent for the antibiotic particles, it is desirable, if the composition may be exposed to excessive moisture, to add another inert anti-caking agent, such as calcium carbonate, starch, calcium phosphate or calcium chloride. Suitable quantities of such anti-caking agent will vary from 0.5 to 2%.

One of the primary advantages of using the anti-caking, coating agents herein described is that although they form non-clogging and non-adhering coated particles of antibiotics, the coated particles are readily broken-down to realize the fine particles of antibiotics in their original state. This breakdown is readily accelerated by, if desired, placing a restriction in the nozzle of the dusting or spraying apparatus. Such a restriction can conveniently be a screen or orifice having an opening of from about one-eighth (0.125) of an inch to about five thirty-seconds (0.166) of an inch in diameter. The opening is preferably about nine sixty-fourths of an inch in diameter. Larger openings are not preferred since they will not revert the particles to the original form. Too few smaller openings are undesirable since it makes the operation of the dusting apparatus difficult.

In addition to the anti-caking, coating agent, the composition can contain conventional stabilizers, although they are not generally necessary, to prevent deterioration of the antibiotics due to the action of heat, light and/or air. Also other therapeutically active ingredients can be incorporated in the compositions of the invention. As an example a non-toxic wetting agent or certain proteolytic enzymes such as streptodornase, pancreatic dornase and trypsin can be added in amounts ranging from about 0.01 to 1.0% of the composition to dissolve or cut the excessive, thickened mucus found in the respiratory tract of animals infected with respiratory diseases.

The following examples are given for the purpose of illustration:

Example 1

The following procedure was used to show the effectiveness of coating fine particles of antibiotic with an insoluble soap.

A 30 gram portion of milled dihydrostreptomycin sulfate wherein 95% of the particles were less than 10 microns in size was placed in a 500 ml. bottle. The indicated amount of additive wherein substantially all of the particles are of approximately 1 to 15 microns in size was added to the bottle, blended and the bottle capped and shaken for a few minutes. The entire 30 grams of dihydrostreptomycin sulfate with the additive are charged to a conventional dust gun used for dusting crops. The total weight of the dust gun and the charge was recorded and the coated antibiotic was discharged using five hard strokes. The gun was reweighed. This was repeated until the discharge from the gun was less than 0.2 gram per stroke.

| Run No. | Percent of Additive | Weight Left in Gun After 30 Strokes (Grams) |
|---|---|---|
| 1 | 0 | 14 |
| 2 | 0 | 15.6 |
| 3 | 0 | 21.0 |
| 4 | 1.6 calcium stearate | 3.3 |
| 5 | 3.0 calcium stearate | 1.9 |
| 6 | 3.2 calcium stearate | 3.0 |
| 7 | 3.2 magnesium stearate | 4.0 |
| 8 | 3.2 calcium stearate | 3.3 |
| 9 | 5.0 zinc stearate | 7.4 |
| 10 | 5.0 iron stearate | 3.4 |
| 11 | 5.0 zinc palmitate | 2.7 |
| 12 | 5.0 barium stearate | 7.2 |
| 13 | 5.0 lithium stearate | 2.5 |
| 14 | 5.0 cadmium stearate | 6.6 |
| 15 | 6.7 calcium stearate | 4.0 |
| 16 | 9.1 calcium stearate | 5.0 |

Example 2

A 30 gram sample of milled neomycin sulfate was mixed with one gram of calcium stearate powder in a 500 ml. bottle. The material was then dusted from a Hudson Admiral No. 766 dust gun. A sample of milled neomycin sulfate with no additive was also tested. Both samples produced extremely fine dispersions. The untreated sample caked badly in the gun. The treated material had a residual of only 1.4 grams after 70 strokes. The dust dispersion is superior to that obtained with dihydrostreptomycin sulfate under the same conditions.

Example 3

The following procedure was used to show the effectiveness of coating fine particles of antibiotic with silicon dioxide.

A thirty gram portion of milled dihydrostreptomycin sulfate wherein 95% of the particles were less than 10 microns was placed in a 500 ml. bottle. The indicated amount of silicon dioxide or other agent having an average particle size of below approximately one micron was added to the bottle, blended and the bottle capped and shaken for a few minutes. The entire 30 grams of dihydrostreptomycin sulfate with the additive are charged to a conventional dust gun used for dusting crops. The total weight of the dust gun and the charge was recorded and the coated antibiotic was discharged using five hard strokes. The gun was reweighed. This was repeated until the discharge from the gun was less than 0.2 gram per stroke.

| Run No. | Percent of Additive | Weight Left in Gun After 30 Strokes (Grams) |
|---|---|---|
| 1 | 0 | 14 |
| 2 | 0 | 15.6 |
| 3 | 0 | 21.0 |
| 4 | 0.5 silicon dioxide | 6.4 |
| 5 | 1.0 silicon dioxide | 4.2 |
| 6 | 3.2 silicon dioxide | 6.5 |
| 7 | 3.2 zinc oxide | 12.4 |
| 8 | 3.2 mixed oxides (iron, manganese and zinc) | 14.2 |

Example 4

The following procedure was used to show the effectiveness of coating fine particles of antibiotic with insoluble crystalline inorganic magnesium salts.

A thirty gram portion of milled dihydrostreptomycin sulfate wherein 95% of the particles were less than 10 microns in size was placed in a 500 ml. bottle. The indicated amount of additive wherein substantially all of the particles are of below approximately 15 microns in size was added to the bottle, blended, and the bottle capped and shaken for a few minutes. The entire 30 grams of dihydrostreptomycin sulfate with the additive are charged to a conventional dust gun used for dusting crops. The total weight of the dust gun and the charge was recorded and the coated antibiotic was discharged using five hard strokes. The gun was reweighed. This was repeated until the discharge from the gun was less than 0.2 gram per stroke.

| Run No. | Percent Of Additive | Weight Left In Gun After 30 Strokes (Grams) |
| --- | --- | --- |
| 1 | 0 | 14 |
| 2 | 0 | 15.6 |
| 3 | 0 | 21.0 |
| 4 | Magnesium Oxide | 6.4 |
| 5 | 3.2 Non-crystalline Magnesium oxide | 11.5 |
| 6 | 3.2 Magnesium oxide | 4.2 |
| 7 | ----do---- | 4.4 |
| 8 | ----do---- | 4.3 |
| 9 | 3.2 Magnesium carbonate | 8.0 |

Example 5

The following procedure was used to show the effectiveness of coating fine particles of antibiotic with vegetable flour.

A 30 gram portion of milled dihydrostreptomycin sulfate wherein 95% of the particles were less than 10 microns was placed in a 500 ml. bottle. The indicated amount of additive wherein substantially all of the particles were below 10 microns in size was added to the bottle, blended, and the bottle capped and shaken for a few minutes. The entire 30 grams of dihydrostreptomycin sulfate with the additive are charged to a conventional dust gun used for dusting crops. The total weight of the dust gun and the charge was recorded and the coated antibiotic was discharged using five hard strokes. The gun was reweighed. This was repeated until the discharge from the gun was less than 0.2 gram per stroke.

| Run No. | Percent Of Additive | Weight Left In Gun After 30 Strokes (Grams) |
| --- | --- | --- |
| 1 | 0 | 14 |
| 2 | 0 | 15.6 |
| 3 | 0 | 21.0 |
| 4 | 1.6–3.2 Soya flour | 4.2 |

Any departure from the above description which conforms to the present invention is intended to be included within the scope of the claims.

I claim:

1. An antibiotic dust useful for combating respiratory diseases in animals, said dust being in the form of a free-flowing mass of fine beadlets comprising antibiotic having a particle size below about 20 microns coated with 0.5 to 20% by weight of an essentially inert and water insoluble coating agent having a particle size less than 15 microns, said coating agent being an anti-caking agent selected from the group consisting of silicon dioxide, water insoluble soaps, vegetable flours, and water insoluble inorganic salts of magnesium, and the said coating agent forming a loose bond with said antibiotic such that the bond is mechanically rupturable in ejecting said beadlets from a dust gun to thereby disperse a dust in which the antibiotic particles approximate their original size.

2. An antibiotic dust as defined in claim 1 wherein the antibiotic is selected from the group consisting of streptomycin, dihydrostreptomycin, and acid salts thereof.

3. An antibiotic dust as defined in claim 1 wherein the antibiotic is dihydrostreptomycin sulfate.

4. An antibiotic dust as defined in claim 1 wherein the antibiotic is neomycin.

5. An antibiotic dust as defined in claim 1 wherein at least 90% of the antibiotic particles are less than 10 microns in size.

6. An antibiotic dust useful for combating respiratory diseases in animals, said dust being in the form of a free-flowing mass of beadlets comprising 95 to 99% by weight of antibiotic having a particle size below about 20 microns coated with 1 to 5% of a water insoluble soap having a particle size less than 15 microns, and the insoluble soap forming a loose bond with said antibiotic such that the bond is mechanically rupturable in ejecting said beadlets from a dust gun to thereby disperse a dust in which the antibiotic particles approximate their original size.

7. An antibiotic dust as defined in claim 6 wherein at least 90% of the antibiotic particles are less than 10 microns in size, and the insoluble soap particles are predominately less than one micron in size.

8. An antibiotic dust as defined in claim 7 wherein the antibiotic is dihydrostreptomycin sulfate and the soap is calcium stearate.

9. An antibiotic dust as defined in claim 7 containing about 97% of dihydrostreptomycin sulfate and about 3% of calcium stearate.

10. An antibiotic dust useful for combating respiratory diseases in animals, said dust being in the form of a free-flowing mass of fine beadlets comprising 95 to 99% of antibiotic having a particle size such that at least 90% of the particles are less than 10 microns, coated with 1 to 5% of silicon dioxide having a particle size predominately less than 2 microns, and said silicon dioxide forming a loose bond with said antibiotic such that the bond is mechanically rupturable in ejecting said beadlets from a dust gun to thereby disperse a dust in which the antibiotic particles approximate their original size.

11. An antibiotic dust useful for combating respiratory diseases in animals, said dust being in the form of a free-flowing mass of fine beadlets comprising 95 to 99% of antibiotic having a particle size such that at least 90% of the particles are less than 10 microns, coated with 1 to 5% of crystalline, water insoluble, inorganic magnesium salt having a particle size predominately less than 5 microns, and said magnesium salt forming a loose bond with said antibiotic such that the bond is mechanically rupturable in ejecting said beadlets from a dust gun to thereby disperse a dust in which the antibiotic particles approximate their original size.

12. An antibiotic dust as defined in claim 11 wherein the magnesium salt is magnesium oxide.

13. An antibiotic dust useful for combating respiratory diseases in animals, said dust being in the form of a free-flowing mass of fine beadlets comprising 95 to 99% of antibiotic having a particle size such that at least 90% of the particles are less than 10 microns, coated with 1 to 5% of vegetable flour having a particle size predominately less than 10 microns, and said vegetable flour forming a loose bond with said antibiotic such that the bond is mechanically rupturable in ejecting said beadlets from a dust gun to thereby disperse a dust in which the antibiotic particles approximate their original size.

14. An antibiotic dust as defined in claim 13 wherein the vegetable flour is soya flour.

(References on following page)

References Cited in the file of this patent

UNITED STATES PATENTS

| Number | Name | Date |
|---|---|---|
| 275,498 | Kirk | Apr. 10, 1883 |
| 639,674 | Edwards | Dec. 19, 1899 |
| 647,695 | Clotworthy | Apr. 17, 1900 |
| 1,599,996 | Fritz | Sept. 14, 1926 |
| 1,629,528 | Pough | May 24, 1927 |
| 1,689,697 | Thornton | Oct. 30, 1928 |
| 1,907,076 | Martin | May 2, 1933 |
| 1,913,796 | Deutman | June 13, 1933 |
| 1,968,628 | Alton | July 31, 1934 |
| 2,012,506 | Griffith | Aug. 27, 1935 |
| 2,071,043 | Nitardy | Feb. 16, 1937 |
| 2,091,202 | Hallock | Aug. 24, 1937 |
| 2,218,031 | Reichert | Oct. 15, 1940 |
| 2,257,545 | Curtis | Sept. 30, 1941 |
| 2,288,410 | Lippman | June 30, 1942 |
| 2,470,296 | Fields | May 17, 1949 |
| 2,533,065 | Taplin | Dec. 5, 1950 |
| 2,533,066 | Taplin | Dec. 5, 1950 |
| 2,539,012 | Diamond | Jan. 23, 1951 |
| 2,542,061 | Smith | Feb. 20, 1951 |
| 2,589,108 | Mark | Mar. 11, 1952 |
| 2,589,330 | Bradford | Mar. 18, 1952 |
| 2,653,899 | Bunch | Sept. 29, 1953 |
| 2,657,170 | Keitt | Oct. 27, 1953 |
| 2,684,947 | Kramer | July 27, 1954 |

FOREIGN PATENTS

| Number | Country | Date |
|---|---|---|
| 348,184 | Great Britain | May 8, 1931 |
| 2,205 | Great Britain | 1882 |
| 22,785/29 | Australia | Oct. 1, 1929 |

OTHER REFERENCES

Coorley: Conf. on Antibiotic Res., Washington, D. C., Jan. 31–Feb. 1, 1947, N. I. H., Bethesda, Md. (3 pp., esp. p. 3).

Bissinger: Agr. Chem., August 1952, pp. 31–33, 117 and 119.

Miller: "Agr. Diluents, Part I," Agr. Chem., November 1950, pp. 43, 45, 47 and 78.

Miller: "Agr. Diluents, Part II," Agr. Chem., December 1950, pp. 45–48 and 93–95, esp. p. 48, Summary.

Woodruff: J. Econ. Entomology, April 1949, pp. 249–253.

Celite: J. Econ. Entomology, August 1948, p. XXIII (advertisement).

Smith: Ind. and Eng. Chem., April 1942, pp. 490–493, esp. p. 492.

Watkins: J. Econ. Entomology, April 1947, pp. 211–214, esp. p. 212.

Science News Letter (SNL), "Combat Newcastle Disease," Aug. 19, 1950, p. 121.

Drug and Cosmetic Industry, "Streptomycin for Sinusitis in Turkeys," vol. 69, No. 5, November 1951, p. 653.

Gross: Poultry Science, vol. 32, No. 2, March 1953, pp. 260-263.